United States Patent [19]

Garin et al.

[11] 4,113,564
[45] Sep. 12, 1978

[54] CORE DISRUPTIVE ACCIDENT MARGIN SEAL

[75] Inventors: John Garin, Oak Ridge, Tenn.; James C. Belsick, Washington Township, Fayette County, Pa.

[73] Assignee: The United States of America as represented by the United States Department of Energy, Washington, D.C.

[21] Appl. No.: 714,220

[22] Filed: Aug. 13, 1976

[51] Int. Cl.$^2$ .................................................. G21C 13/06
[52] U.S. Cl. ..................................... 176/87; 49/316; 176/40; 220/327
[58] Field of Search ................ 176/87, 40, 38; 49/303, 49/174, 194, 316; 220/327

[56] References Cited

U.S. PATENT DOCUMENTS

| 3,599,825 | 8/1971 | Jorgensen | 220/327 |
| 3,698,724 | 10/1972 | Blachere et al. | 277/34.3 |
| 3,805,992 | 4/1974 | Jorgensen | 220/46 R |
| 3,819,478 | 6/1974 | Thorel et al. | 176/87 |
| 3,819,479 | 6/1974 | Jacquelin | 176/87 |
| 3,867,254 | 2/1975 | Brandstetter | 176/87 |

*Primary Examiner*—Verlin R. Pendegrass
*Assistant Examiner*—Ralph Palo
*Attorney, Agent, or Firm*—L. A. DePaul; Z. L. Dermer

[57] ABSTRACT

An apparatus for sealing the annulus defined between a substantially cylindrical rotatable first riser assembly and plug combination disposed in a substantially cylindrical second riser assembly and plug combination of a nuclear reactor system. The apparatus comprises a flexible member disposed between the first and second riser components and attached to a metal member which is attached to an actuating mechanism. When the actuating mechanism is not actuated, the flexible member does not contact the riser components thus allowing the free rotation of the riser components. When desired, the actuating mechanism causes the flexible member to contact the first and second riser components in a manner to block the annulus defined between the riser components, thereby sealing the annulus between the riser components.

4 Claims, 5 Drawing Figures

1

CORE DISRUPTIVE ACCIDENT MARGIN SEAL

GOVERNMENT CONTRACT

The invention described herein was made in the course of, or under, Contract No. E(11-1)2395 with the U.S. Energy Research and Development Administration.

CROSS-REFERENCE TO RELATED APPLICATIONS

The invention herein disclosed is related to copending application Ser. No. 714,221, filed concurrently herewith, entitled "Core Disruptive Accident Margin Seal," by J. Garin which is assigned to the present assignee.

BACKGROUND OF THE INVENTION

This invention relates to seals and more particularly to seals for components of closure heads of nuclear reactors.

In nuclear reactor designs, well known in the art, a reactor vessel with fuel assemblies disposed therein, and having an inlet and an outlet for circulation of a coolant in heat transfer relationship with the fuel assemblies, is sealed by a closure head located on top of the reactor vessel. In certain designs, the closure head comprises one or more rotatable plugs. These rotatable plugs, which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. The annulus, while allowing the rotation of the plugs, also establishes a path for the release of radioactive particles located in the reactor vessel. Accordingly, seals are provided at various locations across the annulus to prevent this release of radioactive particles. The seals also function to prevent oxygen in the atmosphere outside the reactor vessel from passing through the annulus to the reactor coolant which in a liquid metal fast breeder reactor may be liquid sodium because contact of liquid sodium with oxygen may result in a violent reaction. To further prevent oxygen leakage into the reactor vessel, a cover gas is provided that fills the space from the top of the reactor coolant pool to the bottom of the closure head and up the annulus to the seals across the annulus.

In the process of designing such liquid metal fast breeder reactors, it is common practice to analyze the effectiveness of the closure head seals under extreme conditions that are highly unlikely to occur to thereby assure the effectiveness of such seals under normal conditions. During the course of such design the seals are subjected to a sophisticated analysis which determines the seal response under a hypothetical core disruptive accident (CDA), theoretically the worst possible accident. Typically, the CDA is hypothesized to be a case in which, for whatever reason, a void violently propagates in the reactor coolant causing a violent expansion of the reactor coolant which in turn forces the cover gas up the annulus between the closure head plugs where the cover gas and liquid sodium are hypothesized to impact the closure head seals which are across the annulus. To meet design requirements, the seals must be able to contain the cover gas and liquid sodium which will have radioactive particles therein in order to prevent a release of radioactive particles to outside the reactor vessel. There are several kinds of effective closure head seals known in the art.

One type of closure head seal well known to those skilled in the art is a liquid dip seal. In a liquid dip seal, the annulus between the closure head plugs is contoured so that a trough is formed by the annulus itself. A liquid such as liquid sodium is placed in the trough thereby dividing the annulus into two sections, one above the liquid and one below. The cover gas, inside the reactor, containing radioactive particles then extends from the top of the reactor coolant pool up through the annulus to the liquid sodium in the dip seal. The liquid dip seal under normal conditions provides an effective seal against cover gas migration out of the annulus and against oxygen migration into the reactor vessel while allowing the rotatable closure head plugs to rotate relative to each other. However, under the CDA analysis, the expansion of the reactor coolant could force the cover gas up the annulus in a violent manner. In the process, the cover gas could expel the liquid sodium from the dip seal onto seals and bearings located in the annulus above the dip seal, thereby rendering the liquid dip seal ineffective under such hypothesized conditions.

Another type of closure head seal well known in the art is the inflatable seal wherein single or multiple inflatable seals in series are placed across the annulus in a manner well known in the art. During reactor refueling, the inflatable seals are slightly deflated to allow better rotation of the rotatable closure head plugs while during reactor operation the seals are inflated to increase their sealing capability. While inflatable seals are effective under normal conditions, their effectiveness under a CDA analysis is sometimes questioned.

Still another seal well known in the art and designed specifically for CDA conditions is a type of labyrinth seal in which a piece of metal is bolted to one of the closure head plugs so as to extend across the annulus between the plugs to within close proximity to the other plug. The purpose of this seal is to effectively lower the leak path area to thus limit leakage under CDA. However, when subjected to analysis, this seal while theoretically reducing leakage and allowing plug rotation, does not completely solve the problem of preventing release of radioactive particles under severe reactor conditions such as CDA.

In addition, the other commonly known types of seals such as O-rings, bellows, etc., while possibly effective under CDA conditions, do not allow for effective rotation of the closure head plugs.

SUMMARY OF THE INVENTION

An apparatus for sealing the annulus defined between a substantially cylindrical rotatable first component disposed in a substantially cylindrical second component of a nuclear reactor system. The apparatus comprises a flexible member disposed between the first and second components and attached to a metal member which is attached to an actuating mechanism. The actuating mechanism extends from outside the rotatable components to the metal member located within the first and second components. When the actuating mechanism is not actuated, the flexible member does not contact the first component, thus allowing the free rotation of the first and second components. When desired, the actuating mechanism causes the metal member to force the flexible member into close contact with the first and second components in a manner so as to block the annulus defined between the components thereby sealing the annulus.

It is an object of this invention to provide a flexible member disposed between two rotatable components of a nuclear reactor closure head by a metal member attached at one end to the flexible member and at the other end to the closure head for drawing the flexible member substantially vertically into contact with the rotatable components, thus sealing the annulus under severe reactor conditions while allowing rotation of those components under normal reactor conditions.

It is a more particular object of this invention to provide a flexible member disposed between two rotatable components of a nuclear reactor which have surfaces complementary to those of the flexible member by a metal member attached at one end to the flexible member and at the other end to an actuating mechanism located on the closure head for drawing the flexible member substantially vertically into contact with the complementary sides of the rotatable components, thus sealing the annulus under severe reactor conditions while allowing rotation of those components under normal reactor conditions.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In designs of nuclear reactors that utilize rotatable plugs in the closure head of the reactor vessel, there exist annular passageways defined between the rotatable plugs and associated apparatus which allow the rotation of the plugs. In order to meet strict design requirements, seals must be provided that are capable of sealing these passageways under severe reactor conditions. The invention described herein serves to seal those kinds of passageways.

Figure 1:
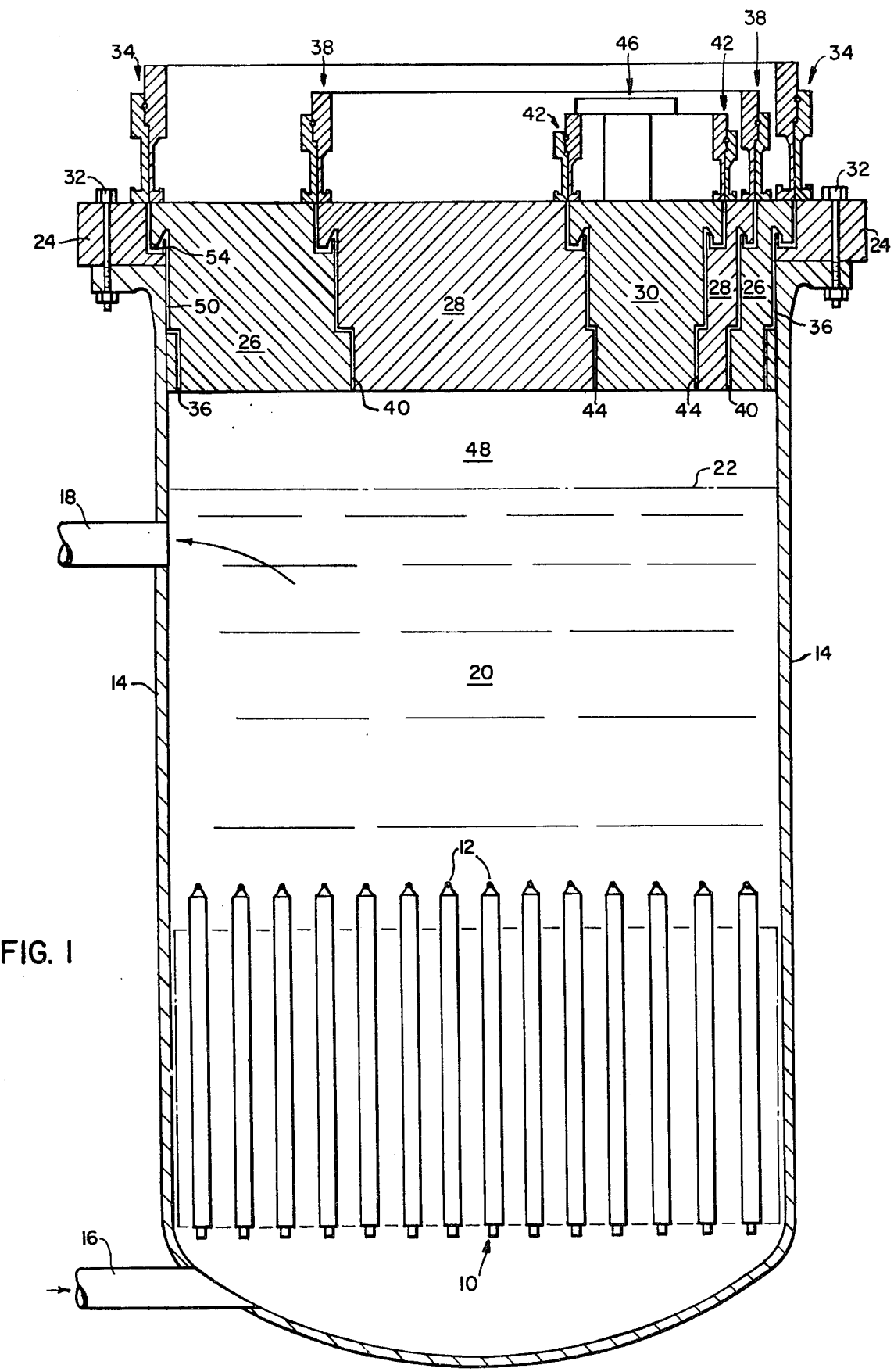
FIG. 1 is a cross-sectional view in elevation of a typical nuclear reactor.

Referring to FIG. 1, a core 10 comprising fuel assemblies 12 that produce heat is contained within a reactor vessel 14. The reactor vessel 14 has an inlet 16 and an outlet 18 that permit a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer peripheral surface of large rotatable plug 26 together with the inner peripheral surface of stationary outer ring 24 define an annulus 36 therebetween. The large riser assembly 34 which contains bearings, seals, and a plug drive mechanism (not shown) enables the large rotatable plug 26 to move relative to stationary outer ring 24 while maintaining a fluid-tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearings, seals, and drive mechanism materials.

Again referring to FIG. 1, intermediate rotatable plug 28 is disposed eccentrically within large rotatable plug 26 and supported by intermediate riser assembly 38 defining an annulus 40 therebetween in a manner similar to that of the large riser assembly 34. Likewise, the small rotatable plug 30 is similarly eccentrically disposed within intermediate rotatable plug 28 and supported by small riser assembly 42 defining an annulus 44 therebetween. In addition, small rotatable plug 30 has disposed therein an invessel transfer collar 46 which provides access for an invessel transfer machine (not shown). During refueling, an in-vessel transfer machine which may be chosen from those well known in the art, is placed in the bore of the invessel transfer collar 46. When the in-vessel transfer machine is in place in the in-vessel transfer collar 46, a selected combination of rotations of the three rotatable plugs 26, 28, 30 will align the in-vessel transfer machine in appropriate relationship with a chosen fuel assembly 12 of the core 10. As well known in the art, the in-vessel transfer machine may then remove the chosen fuel assembly from the core and replace it with a fresh fuel assembly.

When the reactor coolant 20 is liquid sodium, as in the case of liquid metal fast breeder reactors, it is necessary to avoid contact of the liquid sodium with oxygen because this interaction will result in a violent reaction. To thus avoid this interaction, the space between the bottom of the closure head and the coolant level 22 is filled with a cover gas 48 such as argon. The cover gas 48 not only fills the cover gas space between the bottom of the closure head and the top of the coolant level 22, but it also fills the annuli 36, 40, 44. While the cover gas 48 prevents oxygen from contacting the coolant 20, the cover gas 48 itself is subjected to radiation exposure from the core and thus becomes contaminated with radioactive particles. It is, therefore, necessary to have the cover gas 48 circulated between the reactor vessel and a cleaning process to remove most of the radioactive particles in a manner well known in the art. As previously indicated, it is, nevertheless, necessary to prevent this cover gas 48 from escaping up the annuli 36, 40, 44 through the seals in the closure head, and out of the reactor vessel.

Figure 2:
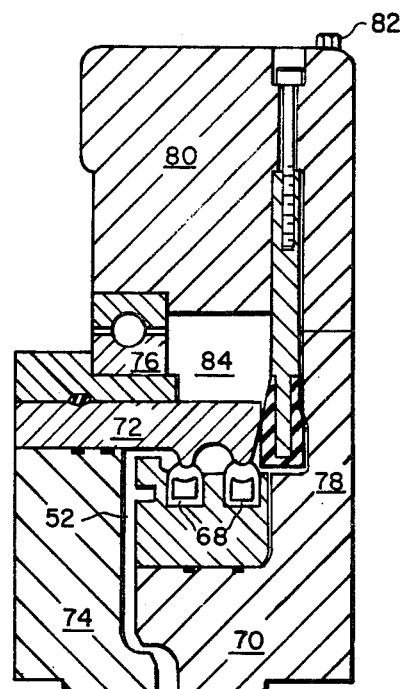
FIG. 2 is a cross-sectional view in elevation of a typical riser assembly with the invention.
Figure 2:
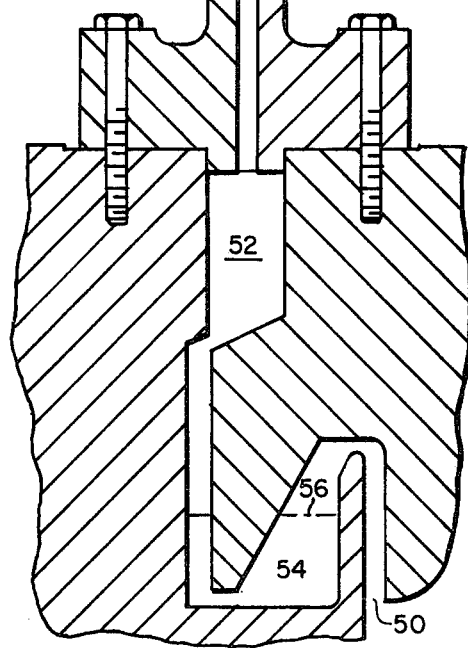

FIG. 2 represents a typical riser assembly which is similar to the riser assemblies 34, 38 and 42. The annuli 36, 40 and 44 are represented by a typical annulus which is divided into two portions 50 and 52. Dividing the lower annulus 50 from the upper annulus 52 is a dip seal 54 which may be chosen from those well known in the art, such as a liquid sodium dip seal. The cover gas 48 fills the lower annulus 50 up to the dip seal level 56. The liquid sodium in dip seal 54 will prevent the contaminated cover gas 48 from migrating from the lower annulus 50 into the upper annulus 52. However, increased cover gas pressure may force cover gas 48 to bubble through dip seal 54 which may result in a small amount of cover gas 48 being released into the upper annulus 52. Under normal reactor conditions, the dip seals 54 can be effective against release of radioactive particles while allowing the rotation of the rotatable plugs.

Again referring to FIG. 2, in order to seal the upper annulus 52 from the atmosphere as a further protection from both oxygen in-leakage and cover gas out-leakage, two inflatable elastomer seals 68 are arranged in series on inner riser 70 in a manner well known in the art. A forked member 72 which is a seal runner is disposed on the outer riser assembly 74 in a manner so as to contact inflatable seals 68 thereby sealing the upper annulus 52. In addition, inner riser 70 is supported from the outer riser assembly 74 by bearing 76 to permit relative rotation between the riser assemblies as the plugs rotate. A lubricant which may be chosen from those well known in the art may be applied to the inflatable seals 68 to insure proper sealing and minimize friction between inflatable seals 68 and forked member 72. During reactor operation the inflatable seals 68 are inflated so that the inflatable seals 68 conform to the surface of forked member 72 and the seating area of the seals thereby increasing contact between the inflatable seals 68 and forked member 72 thus increasing the sealing effect. However, during refueling of the reactor it is necessary to rotate the rotatable plugs. Rotation of the rotatable plugs requires rotation of the inner riser 70 relative to the outer riser 74, which in turn, means that there must be relative rotational motion between forked member 72 and inflatable seals 68. To aid this rotational motion, the inflatable seals 68 are slightly deflated just prior to the time plug rotation takes place.

While the liquid dip seal 54 and inflatable seals 68 are effective under normal reactor conditions, CDA (Core Disruptive Accident) analysis indicates such seals may not be completely effective under all conditions of reactor operation. The hypothesis of the CDA is that the reactor coolant 20 is violently forced toward the bottom of the closure head which in turn forces cover gas 48 up the lower annulus 50. Cover gas 48, under pressure from the reactor coolant force, expels the liquid sodium from dip seal 54 through upper annulus 52 and past the inflatable seals 68. Under CDA hypothesis, it is further hypothesized that the liquid sodium and cover gas passing by inflatable seals 68 will escape from the riser assembly through small gaps around bearing 76. The invention described herein is a further protection against such a release from the riser assemblies.

Figure 3:
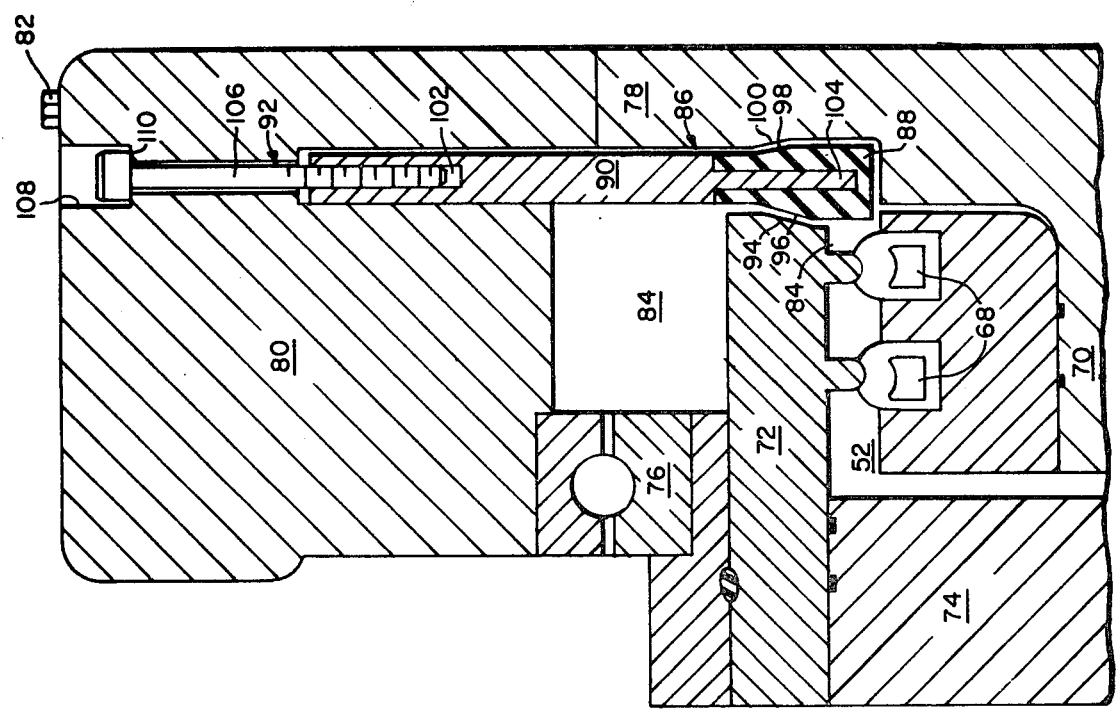
FIG. 3 is a cross-sectional view in elevation of a typical riser assembly showing the invention in detail in the non-actuated position.
Figure 5:
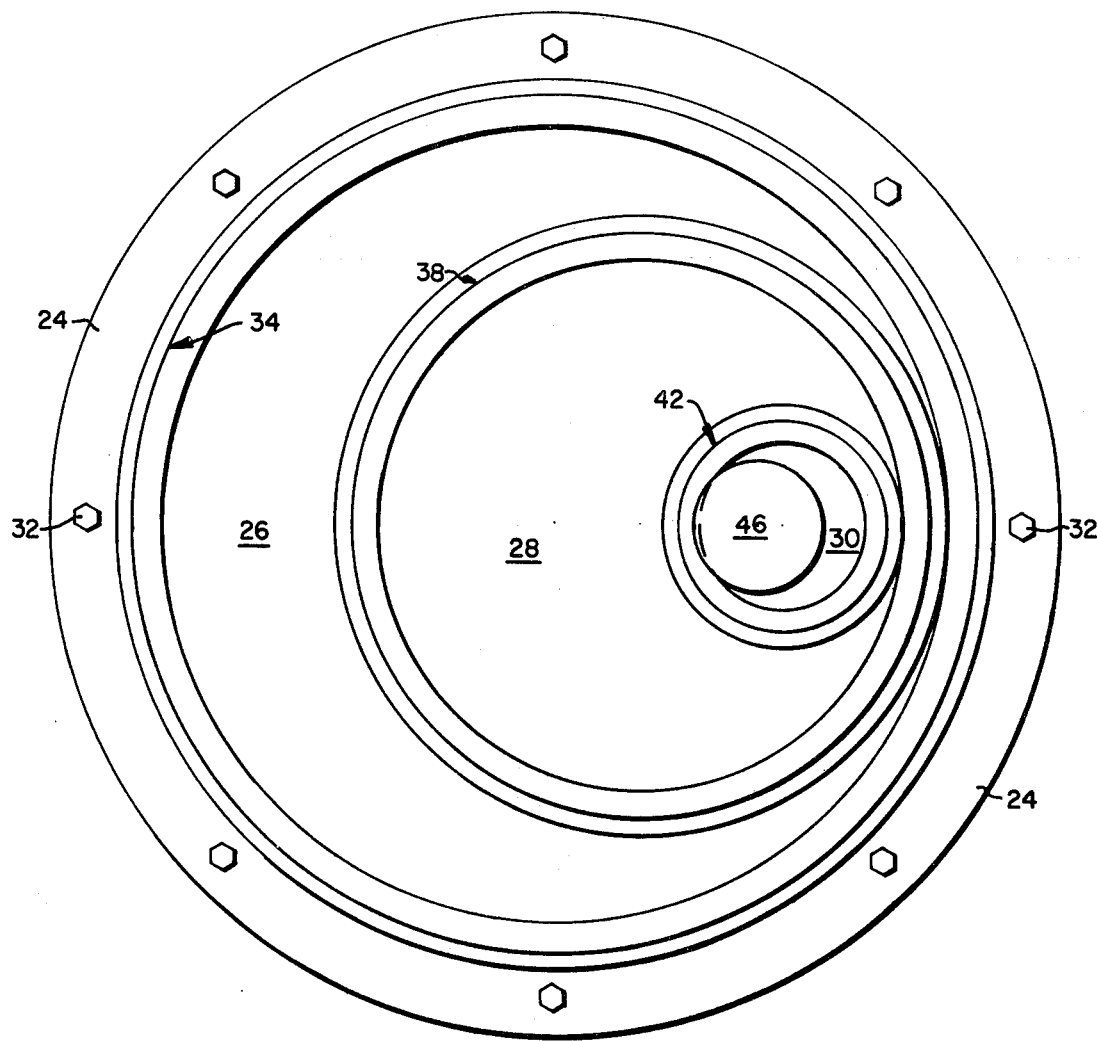

Referring now to FIG. 3, the upper portion of the inner riser 70 is divided into two portions, riser segment 78 and gear segment 80. Generally, riser segment 78 is an integral part of inner riser 70 while gear segment 80, which is connected to gears and drive mechanisms (not shown) that allow plug rotation, may be a separable component. Gear segment 80 may be removed from riser segment 78 by releasing bolts 82. Removal of gear segment 80 provides access to bearing 76 and annular cavity 84 which is the portion of upper annulus 52 above inflatable seals 68 and near bearing 76.

Referring again to FIG. 3, disposed in annular cavity 84 is margin seal 86 which comprises a flexible member 88, a metal member 90, and an actuating mechanism 92. Flexible member 88 which may be constructed out of an elastomer material chosen from those well known to those skilled in the art or soft metal such as copper or aluminum and bonded to metal member 90 in a manner well understood by those skilled in the art, is formed to substantially conform to the members surrounding it along its circumferential surfaces. For example, when forked member 72 is formed with a beveled edge 94 then flexible member 88 will have a substantially conforming first side 96. Likewise, flexible member 88 may have a conforming second side 98 when riser segment 78 has a notch 100 therein. Beveled edge 94 and notch 100 along with sides 96 and 98 of flexible member 88 allow a tight fit for flexible member 88 between forked member 72 and riser segment 78 when flexible member 88 is drawn thereagainst after the margin seal 86 has been actuated by the actuating mechanism 92.

Metal member 90 consists of a metal ring which may be stainless steel having one end formed to fit into flexible member 88 and having the other end formed with threaded bores 102 therein. The one end of metal member 90 is bonded into groove 104 in flexible member 88 in a manner well known in the art. Bores 102 are spaced at several locations around the circumference of metal member 90 and are formed to accommodate an attachment to actuating mechanism 92. In the particular embodiment shown in FIGS. 3 and 4, the actuating mechanism 92 consists of bolts 106. Bolts 106 fit into threaded bores 102 as is well understood in the art while the head of bolt 106 extends up through annular cavity 84 into slot 108 in gear segment 80 and rests on ledge 110 of slot 108. Slot 108 extends from ledge 110 to the top of gear segment 80 thereby providing access for turning bolts 106. While actuating mechanism 92 is described herein as a bolting arrangement, it is understood that actuating mechanism 92 is not limited to that embodiment, but may also include other mechanisms such as a pressurized piston or electrical arrangement for actuating margin seal 86.

OPERATION

Figure 4:
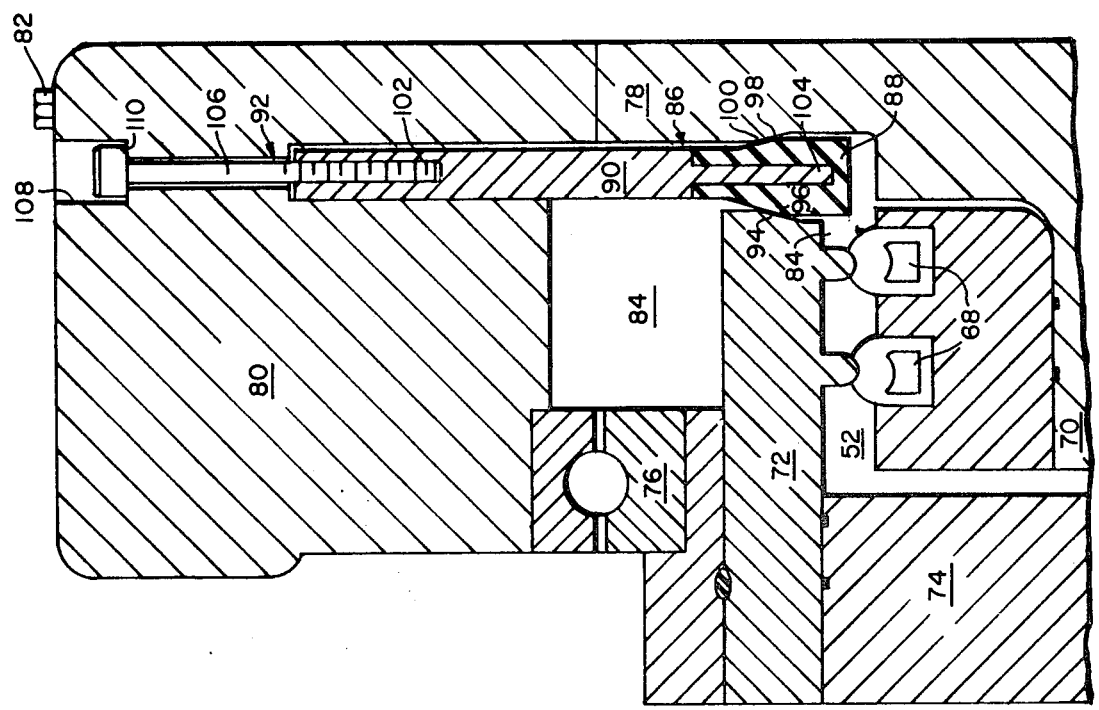
FIG. 4 is a cross-sectional view in elevation of a typical riser assembly showing the invention in detail in the actuated positon; and, FIG. 5 is a plan view of the nuclear reactor shown in FIG. 1.

During reactor refueling when it is necessary to rotate the closure head plugs and riser assemblies attached thereto with relative ease in order to position refueling machines in appropriate relationship to the core as is well known in the art, the actuating mechanism 92 is placed in a non-actuated position as shown in FIG. 3. When in this non-actuated position, the head of bolts 106 rests loosely on ledge 110 and flexible member 88 does not contact forked member 72 or riser segment 78. Therefore, beveled edge 94 does not contact first side 96 and notch 100 does not contact second side 98. In this position, inner riser 70 may rotate, without hindrance, relative to outer riser 74 and forked member 72 attached thereto. However, during reactor operation when it is not necessary to rotate the closure head plugs and riser assemblies attached thereto, actuating mechanism 92 can actuate margin seal 86 as shown in FIG. 4. In order to actuate margin seal 86, bolts 106 are turned in sequential fashion so as to draw metal member 90 upward which in turn draws flexible member 88 upward until flexible member 88 contacts forked member 72 and riser segment 78. When in this actuated position, beveled edge 94 is in close contact with first side 96 while second side 98 is in close contact with notch 100, thereby dividing annular cavity into two sections, and isolating upper annulus 52 from the atmosphere outside the riser assembly thus sealing the annulus defined within the riser assembly. Not only does margin seal 86 form an effective gas seal, but under the impact of hot liquid sodium as in CDA conditions, margin seal 86 deforms slightly absorbing the impact and forming a tighter seal. It should be noted that flexible member 88 remains in contact with forked member 72 and riser segment 78 even when there is relative vertical motion between outer riser 74 and riser segment 78. Therefore, the invention herein described provides an apparatus capable of effectively sealing an annulus between rotatable components of a nuclear reactor against expulsion of liquid sodium and gases under severe reactor conditions while allowing rotation of those components under normal reactor conditions.

While there is described what is now considered to be the preferred embodiment of the invention, it is, of course, understood that various other modifications and variations will occur to those skilled in the art. The claims, therefore, are indented to include all such modifications and variations which fall within the true spirit and scope of the present invention. For example, flexible member 88 need not be formed in the same shape as described herein, but may be shaped to conform to the shape of the particular component in which it is disposed. Furthermore, the actuating mechanism 92 need not be a bolt arrangement but may be a piston cylinder arrangement or an electrical system that are well known in the art. Furthermore, the flexible member 88 need not be an elastomer but may be made out of a soft metal such as copper.

We claim:

1. A nuclear reactor system including a vessel, fuel assemblies positioned therein, an inlet and an outlet for circulating a coolant in heat transfer relationship with said fuel assemblies, and a closure head disposed on said vessel in a fluid tight relationship, said closure head comprising:

seal means disposed in a first annulus defined between a first and a second component of said closure head for sealing said first annulus when actuated while allowing free rotation of said components with respect to each other when not actuated;

actuating means attached to said seal means for drawing said seal means substantially vertically into contact with both said first and said second component for sealing said first annulus.

2. The system recited in claim 1 wherein said seal means comprises:

a flexible member having sides complementary to said first and second components and disposed in said first annulus for sealing said first annulus when drawn substantially vertically into contact with said complementary sides of said first and second components; and a metal member attached at one end to said flexible member and at the other end to said actuating means for drawing said flexible member into contact with said first and second components under the action of said actuating means thereby sealing said first annulus.

3. The system recited in claim 2 wherein said actuating means comprises a bolting mechanism attached at one end to said metal member and at the other end to said closure head for drawing said metal member substantially vertically thereby drawing said flexible member into contact with said first and said second components, thus sealing said first annulus.

4. The system recited in claim 3 wherein said flexible member is freely suspended between said first component and said second component when said actuating means is not actuated and contacts both said first component and said second component when said actuating means is actuated.

* * * * *